Patented Nov. 6, 1945

2,388,515

UNITED STATES PATENT OFFICE 2,388,515

MODIFIERS FOR POLYMERIZATION OF BUTADIENE-1,3 HYDROCARBONS

Benjamin M. G. Zwicker, Akron, Ohio, and William D. Stewart, Yonkers, N. Y., assignors to The B. F. Goodrich Company, New York, N. Y., a corporation of New York No Drawing. Application May 15, 1944, Serial No. 535,763

14 Claims. (Cl. 260—84.5)

This invention relates to the modification of the polymerization of butadiene-1,3 hydrocarbons to form synthetic rubber products closely resembling natural crude rubber in plasticity and processability, and particularly to the polymerization of butadiene-1,3 hydrocarbons in aqueous emulsion in the presence of a new and improved class of polymerization modifiers.

The polymerization in aqueous emulsion of butadiene-1,3 hydrocarbons either alone or in admixture with each other, or with other organic compounds copolymerizable therewith, to form products more or less resembling natural rubber, is well known. It has been commonly observed, however, that such products often resemble vulcanized natural rubber rather than unvulcanized natural rubber in plasticity and processability unless the polymerization is effected in the presence of small amounts of certain organic compounds called "modifiers" or "regulators" of polymerization.

It has already been disclosed in the copending application of Charles F. Fryling Serial No. 396,155, filed May 31, 1941, that 2-mercapto-benzothiazole and similar compounds containing a 2-thio-arylenethiazyl group, modify the emulsion polymerization of butadiene-1,3 hydrocarbons in such a manner that polymers more nearly resembling natural crude rubber are produced. The use of these substances as polymerization modifiers, however, has been seriously limited because of the fact that they retard the polymerization rate, often to such an extent that the presence of polymerization catalysts, along with these compounds, still does not enable the polymerization to be effected in the required short time.

We have now discovered that derivatives of 2-thio-arylenethiazyl compounds which contain an alkyl group attached to a ring carbon atom, are superior as polymerization modifiers to the simple unsubstituted 2-thioarylenethiazyl compounds such as 2-mercapto-benzothiazole, since their presence, during the polymerization of butadiene-1,3 hydrocarbons, not only enables more plastic and more readily processable synthetic rubber products to be produced, but also enables the polymerization to be conducted much more rapidly than is possible with the unsubstituted compounds. Accordingly, this invention comprises the polymerization of butadiene-1,3 hydrocarbons in the presence of these new and improved polymerization modifiers.

Any compound containing a 2-thio-arylenethiazyl group in which at least one alkyl radical is attached to a ring carbon atom may be employed as the polymerization modifier in the method of this invention. Although the 2-thio-arylenethiazyl group in which the alkyl group is substituted may be any group containing the structure:

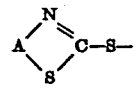

wherein A is an arylene group having its two valences on adjacent ring carbon atoms, such as ortho-phenylene, ortho-naphthylene, ortho-anthrylene, and the like, it is preferable that the modifiers used be alkyl derivatives of compounds containing a 2-thio-benzothiazyl group. The 2-thio-benzothiazyl group possesses the structure:

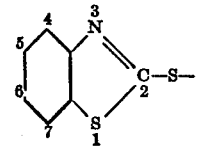

hence, it is evident that in the preferred compounds of this invention an alkyl group will be attached to one or more of the carbon atoms numbered 4 to 7 in the above structure. The alkyl group present may be either long or short, straight-chained or branched, primary, secondary, or tertiary, including methyl, ethyl, n-propyl, isopropyl, n-butyl, isobutyl, secondary-butyl, tertiary-butyl, n-amyl, 2-ethylhexyl, lauryl, tri-isobutyl and the like, but groups containing from 1 to 8 carbon atoms and particularly branched-chain alkyl groups containing from 3 to 6 carbon atoms present in the 5 position in the above structure are preferred.

The nature of the remaining portion of the structure of the compounds described, that is, the group attached to the unattached valence of the non-nuclear sulfur atom (the sulfur atom of the thio group) is of relatively lesser importance in this invention and may be varied widely. In general, however, the group attached to the thio-sulfur atom will be a mono-valent, non-metallic structure, preferably containing no elements other than carbon, hydrogen, oxygen, nitrogen and sulfur, capable of being covalently bonded to the sulfur atom, examples of which include hydrogen atoms and monovalent organic radicals including aliphatic, alicyclic, aromatic and heterocyclic organic radicals, whether or not containing functional or substituent groups and whether having their monovalency on a carbon or some other atom. From the foregoing, it is apparent that the modifiers employed in this invention will generally possess the following structure:

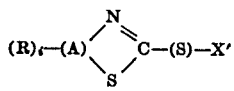

wherein A is a bivalent aromatic ring structure, R is alkyl; $i$ is an integer at least two less than the number of carbon atoms in the aromatic ring structure, and X' is a monovalent radical containing no elements other than carbon, hydrogen, oxygen, nitrogen and sulfur.

The preferred compounds in the class described consist of compounds of the above formula wherein X' is an hydrogen atom, that is, the alkyl-substituted 2-mercapto-arylenethiazoles. Examples of compounds of this type include 4 - methyl - 2 - mercaptobenzothiazole, 5 - ethyl-2-mercaptobenzothiazole, 4,5-dimethyl-2-mercaptobenzothiazole, 5-tertiary-butyl-2-mercaptobenzothiazole, 5 - isopropyl - 2 - mercapto - benzothiazole, 4,5,7-trimethyl-2-mercaptobenzothiazole, 4-methyl-5-secondary - butyl - 2 - mercaptobenzothiazole, 5-lauryl-2-mercaptobenzothiazole, and the like, as well as the corresponding alkyl substituted 2-mercapto napthothiazoles and the like.

Another type of compound within the class described consists of the alkyl-substituted arylenethiazyl-2 sulfides, the term "sulfide" being used generically to include not only monosulfides, but also di- and polysulfides, and to include not only symmetrical sulfides, but also unsymmetrical or mixed sulfides. The preferred sulfides are those of the formula:

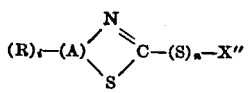

wherein A, R, and $i$ are the same as defined hereinabove, $n$ is a small integer, preferably no greater than four, and X" is a monovalent organic radical containing no elements other than carbon, hydrogen, oxygen, nitrogen and sulfur, and having its monovalency on a carbon atom such as aliphatic, aromatic, alicyclic and heterocyclic groups. Although X" radicals of this type in which the terminal carbon atom (the carbon atom bearing the monovalency) is a plurally bound carbon atom, that is, a carbon atom connected by a plural bond to another atom, preferably an atom other than carbon such as oxygen, sulfur or nitrogen, and which are electronegative in character, such as aliphatic and aromatic acyl and thioacyl, carbamyl and thiocarbamyl, xanthogenyl and thioxanthogenyl thiazyl, cyano nitroaryl and the like are especially preferred in compounds having the formula above, other radicals such as hydroxy-alkyl, amino-alkyl, arylaminoalkyl, alkyl, alkenyl, and other monovalent aliphatic radicals, aminoaryl, alkoxyaryl, aryl and other aromatic radicals and furyl, pyridyl, quinolyl, indolyl and other heterocyclic radicals may also be the radical represented by X". Of these compounds the di-(alkyl-substituted arylene-thiazyl-2) mono- and disulfides, as well as other thiazyl, mono- and disulfides wherein the thiazyl group occupying the position of X" in the above formula is any thiazyl group including alkyl-substituted thiazyl groups, and arylene thiazyl groups, are especially preferred. Typical examples of compounds occurring in this class include the following:

Di-(4-methyl-benzothiazyl-2) disulfide
Di-(4-methyl-benzothiazyl-2) monosulfide
Di-(5-tert. butyl-benzothiazyl-2) disulfide
Di-(4,5-dimethyl-benzothiazyl-2) disulfide
5-butyl-benzothiazyl-2 thiomethylene hydrin (or 5-butyl-benzothiazyl-2 hydroxy-methyl monosulfide—the reaction product of 5-butyl-2-mercaptobenzothiazole and formaldehyde)
5-tert.-butyl-benzothiazyl-2 benzoyl monosulfide
4,5-dimethyl-benzothiazyl-2 5-nitrobenzothiazyl-2 monosulfide
5-tert.-butyl-benzothiazyl-2 4-methyl-thiazyl-2 disulfide
5-ethyl-benzothiazyl-2 cyano monosulfide
5-isopropyl-benzothiazyl - 2 ortho - nitrophenyl monosulfide
5-tert.-butyl-benzothiazyl-2 acetyl monosulfide
5-tert.-butyl-benzothiazyl-2 dimethylcarbamyl monosulfide
Bis(5-butyl-benzothiazyl-2) trisulfide
Bis(4-lauryl-benzothiazyl-2) disulfide
Bis(4,5-dimethyl-benzothiazyl-2) tetrasulfide
Bis(4,5-dimethyl-naphthothiazyl-2) disulfide.

Still other compounds containing an alkyl-substituted arylenethiazyl-2 group are also included in the class of modifiers of this invention. For example, amine sulfides conforming to the formula above, wherein X" is a radical linked to the sulfur by an amine nitrogen atom, such as 4-methyl-benzothiazyl-2 diethyl amino sulfide, and the like and the corresponding disulfides are also included in this invention, but in general they offer no advantages over the mercaptothiazoles from which they are derived.

In the practice of the invention, monomeric butadiene-1,3 hydrocarbons, either alone or in admixture with other copolymerizable monomers, preferably styrene or acrylonitrile, are polymerized in aqueous emulsion in the presence of any of the above-described modifiers. In this process the monomeric materials to be polymerized are emulsified in water with the aid of a suitable emulsifying agent; the modifier of polymerization together preferably with an initiator of polymerization, and if desired, with catalysts and accelerators of polymerization or other substances necessary or desired for some other purpose, are included in the emulsion and polymerization is then effected at a temperature of about 20 to 100° C., preferably with constant agitation of the emulsion for a time sufficient to convert a predominant amount, preferably from 75 to 100% of the monomers into polymers. If the polymerization is conducted only for a time less than is required for substantially complete conversion of monomers into polymers, the polymerization may be terminated at the desired conversion by addition of polymerization inhibitors, such as phenyl-beta-naphthylamine, beta-naphthol and hydroquinone, such substances also serving to stabilize the polymer formed against oxidation. Another alternative in this process consists in adding the modifier of polymerization, or any of the other ingredients, to the emulsion continuously or in stages during the course of the polymeriztaion. Moreover, the emulsion polymerization may be carried out in batch operation or it may be effected in a continuous process.

This method of polymerization, employing the alkyl-substituted 2-thioarylenethiazyl modifiers described, is applicable to any polymerizable butadiene-1,3 hydrocarbon such as butadiene-1,3, isoprene, 2,3-dimethyl butadiene-1,3, piperylene, 2-ethyl butadiene-1,3, 2-phenyl butadiene-1,3 and the like either alone or in admixture in any suitable proportion with each other or with one or more other unsaturated polymerizable compounds copolymerizable therewith in aqueous emulsion. Compounds copolymerizable with butadiene-1,3 hydrocarbons are generally compounds of the structure

wherein from two to three of the disconnected valences are attached to hydrogen atoms, and are preferably compounds of this

structure wherein additionally at least one of the disconnected valences is attached to an electronegative group such as chlorine, cyano or organic groups comprising a plural linkage such as aryl groups, groups containing a

structure, a —C≡C— structure, a

structure or the like. Such compounds include, in addition to other butadiene-1,3 hydrocarbons, other conjugated dienes containing the general structure

wherein at least two of the disconnected valences are attached to hydrogen and at least one is attached to a similar

group such as chloroprene, 2-cyano butadiene-1,3, cyclopentadiene, myrcene and the like and monoolefinic copolymerizable compounds (compounds containing a single olefinic double bond present in the structure

wherein from two to three of the disconnected valences are attached to hydrogen, and particularly those containing a single olefinic double bond present in a

structure wherein at least one of the disconnected valences is atached to an electronegative group) such as styrene, vinyl naphthalene, para-chloro styrene, para-methoxy styrene, alpha-methyl styrene and other aryl olefins having an aryl group attached to a carbon atom of a

group; acrylonitrile, methacrylonitrile, alpha-chloro acrylonitrile, methyl acrylate, methyl methacrylate, methallyl methacrylate, methyl alpha-chloro acrylate, acrylic acid, acrylamide, methacrylamide and other polymerizable acrylic compounds possessing a

group; vinyl methyl ketone, acrolein, methyl isopropenyl ketone, methyl vinyl ether, methyl vinyl ethylnyl carbinol, diethyl fumarate, diallyl maleate, vinyl acetate, vinyl pyridine, vinylidene chloride, isobutylene and other monoolefinic unsaturated hydrocarbons, ethers, acids, alcohols, aldehydes, ketones, and esters of the character described. When mixtures of butadiene-1,3 hydrocarbons with such copolymerizable compounds are employed it is preferable that the butadiene-1,3 hydrocarbon be present in a predominant amount, that is, to the extent of at least 50% by weight of the mixture.

As mentioned hereinabove, in the polymerization of the butadiene-1,3 hydrocarbon in aqueous emulsion in the presence of the modifiers of this invention, it is generally necessary to employ one or more emulsifying agents. The nature of the emulsifying agents so used may be varied widely, any substances capable of maintaining an aqueous emulsion of the butadiene-1,3 hydrocarbons being effective for this purpose. Suitable emulsifying agents include fatty acid soaps, such as sodium oleate, ammonium linoleate, sodium myristate and the like and soaps of rosin and hydrogenated or dehydrogenated rosin acids such as sodium abietate and sodium dihydroabietate; synthetic saponaceous materials including hymolal sulfiates and alkaryl sulfonates such as sodium lauryl sulfate and sodium isopropyl naphthalene sulfonate; salts of organic bases containing long carbon chains such as lauryl amine hydrochloride, trimethylcetylammonium methyl sulfate and C-cetyl betaine; and non-polar emulsifying agents such as the condensation product of lauryl alcohol and ethylene oxide. The choice of the emulsifying agent will depend primarily upon whether it is desired to polymerize in an acid, alkaline or neutral emulsion, all such emulsions of varying pH being effective with the modifiers described, although alkaline emulsions using soaps as emulsifying agents are preferred. The amount of the emulsifying agent may also be varied widely and is not critical but in general amounts of from 1 to 5% based on the material polymerized are preferred, this amount corresponding to considerably less than 5% based on the water present in the emulsion since the amount of polymerizable material is generally less than that of the water present.

In addition to the alkyl-substituted 2-thioarylenethiazyl modifiers, the aqueous emulsion of the butadiene-1,3 hydrocarbon will also preferably contain a polymerization initiator since the presence of such a substance enables the polymerization to be started rapidly. The preferred initiators to be employed are per-oxygen compounds including hydrogen peroxide, benzoyl peroxide, ammonium persulfate, potassium persulfate, sodium perborate and other peroxides and persalts although other types of initiators such as sulfur dioxide, sodium bisulfite, diazoaminobenzene and triphenylmethylazobenzene may also be used.

It is also especially desirable to employ a polymerization catalyst or accelerator during the polymerization in the presence of the alkyl-substituted 2-thioarylenethiazyl modifiers of this invention. Water-soluble heavy metal compounds including both simple water-soluble heavy metal salts and complex water-soluble heavy metal salts, particularly the water-soluble compounds of heavy metals occurring in group VIII of the first long period of the periodic table (i. e., iron, cobalt and nickel) such as cobaltous chloride, ferric sulfate, sodium ferri pyrophosphate, sodium cobaltinitrite, potassium ferricyanide and the like, are preferred catalysts for use with the modifiers of this invention since their presence greatly speeds up the polymerization rate and also assists in the production of products of the desired high quality. Another class of substances which may be employed to great advantage with the modifiers of this invention are the aliphatic mercaptans containing at least 12 carbon atoms such as lauryl mercaptan, triisobutyl mercaptan, cetyl mercaptan, octadecyl mercaptan and the like. These mercaptans act as accelerators for the polymerizations described and also have some modifying action, but the polymerization in presence of both a mercaptan and an alkyl-substituted 2-thioarylenethiazyl modifier results in quite rapid polymerizations yielding high quality products which not only are plastic and easily processed like unvulcanized natural rubber but also are capable of yielding vulcanizates which are superior in strength and in other properties to natural rubber vulcanizates, a result which is not possible when employing only a mercaptan as the modifier.

The amounts of the alkyl-substituted 2-thio-arylenethiazyl modifier, as well as of the polymerization initiators and catalysts, if any, which are employed in the polymerization process may be varied widely depending upon the properties desired in the product as well as upon the particular substances present in the emulsion, and are not strictly critical. In general, however, the amount of the modifier will be between about 0.1 and 2.0% by weight based on the weight of polymerizable material present, the higher amounts giving products of greatest plasticity. The amount of the initiator need be only quite small, less than 1.0% based on the polymerizable material present while the amount of the catalyst will similarly be less than 1% in most instances, and often less than 0.5%, particularly when the catalyst is a heavy metal compound. However, when mercaptans are employed with the thiazyl modifiers the amount of each may be between 0.1 and 1.0%, with the amounts of each of the two substantially equal, to good advantage. Generally there is no advantage in employing over 2% of any one of these ingredients or of over 5% of all these ingredients combined; and as little as 0.1% of each ingredient or even less is often quite effective, in the case of water-soluble heavy metal catalysts amounts as little as 0.01% or even less, often being preferable.

It is to be understood that the above discussion of the various ingredients present in the emulsion during polymerization is given only to show preferred procedures and that the polymerization of the butadiene-1,3 hydrocarbon in aqueous emulsion may be conducted in any desired manner, provided only that an alkyl-substituted 2-thio-arylenethiazyl compound is present in the emulsion during the polymerization.

The products obtained from the above-described emulsion polymerization process consist of latex-like dispersions containing butadiene-1,3 polymers or copolymers dispersed in an aqueous medium. Such synthetic latices may be treated in any desired manner and utilized in the same general manner as natural rubber latex. For example they may be subjected to distillation processes to remove the unpolymerized monomers if any; they may be treated to increase the size of the particles of polymer contained therein; they may be utilized as such either compounded or uncompounded in the production of synthetic rubber articles by deposition processes, coating processes and the like and they may be coagulated in any desired manner to produce a synthetic rubber coagulum closely resembling the unvulcanized natural crude rubber obtained from natural rubber latex in plasticity and processability. Such synthetic rubber may then be utilized in the same general manner as natural rubber to produce a wide variety of vulcanized and unvulcanized products which are often superior to natural rubber products in many properties.

To illustrate the practice of the invention and the desirable results to be obtained by employing the polymerization modifiers herein described, the following specific examples are cited but it is to be understood that wide variations may be effected therein in accordance with the foregoing disclosure without departing from the spirit and scope of the invention.

In the examples, all parts are by weight.

EXAMPLES 1 TO 10

In Examples 1 to 10, the details of which are given in the table, each charge consisted of 75 parts of butadiene-1,3 and 25 parts of styrene as the polymerizable material; 180 parts of water containing 5 parts of fatty acid soap as the aqueous emulsifying solution; 0.35 part of potassium persulfate as a polymerization initiator, and the stated quantities of polymerization modifiers as shown in the table. These ingredients were thoroughly mixed to form an emulsion and the monomeric materials present were polymerized by agitating the emulsion at a constant temperature of 50° C. for the number of hours given in the table. A small amount of phenyl-beta-naphthylamine was then added to the latex-like dispersion obtained in each case. The dispersion was coagulated, and the rubber-like polymer thus obtained was washed and dried. A sample of the synthetic rubber obtained in each case was then tested to determine its solubility in benzene at 40° C., since this test is an excellent criterion of the plasticity and processability of the synthetic rubber, the results being shown in the table. The remaining portion of the polymer obtained in each example was sheeted out on a two-roll mixing mill, and was compounded with conventional compounding and vulcanizing ingredients in a typical tire-tread recipe, it being observed in each case that the synthetic rubbers were readily milled either on a hot or cold mill. The compounded sample from each example was then vulcanized for 30 to 45 minutes at 290° F. and the tensile strength and elongation of the resulting vulcanizate was determined and found to be as shown in the table.

Two control charges were also carried out in order to show the effect of the presence of the alkyl-substituted 2-thio-arylenethiazyl modifiers on the polymerization and on the properties of the product. The details of these controls are shown in the table as control A and control B.

Table

| Ex. No. | Modifier | Other substances (catalysts, etc.) | Time, hours | Yield, per cent | Solubility in benzene, per cent | Properties of vulcanizates | |
|---|---|---|---|---|---|---|---|
| | | | | | | Tensile strength, lbs./sq. in. | Ultimate elongation, per cent |
| 1 | 2-mercapto-4-methyl-benzothiazole—0.45 part. | None | 15½ | 81 | 25.2 | 3,300 | 560 |
| 2 | Same as Example 1 | Complex pyrophosphates of iron and cobalt.[1] | 15½ | 89 | 24.3 | 3,200 | 560 |
| 3 | Same as Example 1 | Lauryl mercaptan—0.2 part | 15½ | 94 | 40.3 | 3,300 | 560 |
| 4 | Same as Example 1 | Cobaltous chloride—0.01 part. Ferric sulfate—0.01 part. | 15½ | 91 | 30.0 | 3,725 | 545 |
| 5 | 2-mercapto-4-methyl-benzothiazole—0.60 part. | None | 22½ | 98 | 23.0 | 2,900 | 470 |
| 6 | Same as Example 5 | Same as Example 2 | 15½ | 90 | 24.7 | 3,000 | 550 |
| 7 | 2-mercapto-5-tert.-butyl benzothiazole—0.47 part. | None | 22½ | 91 | 14.7 | 3,400 | 550 |
| 8 | Same as Example 7 | Same as Example 2 | 15½ | 89 | 18.6 | 3,300 | 540 |
| 9 | Same as Example 7 | Cetyl mercaptan—0.2 part | 15½ | 93 | 18.6 | 2,800 | 520 |
| 10 | Same as Example 7 | Same as Example 4 | 15½ | 91 | 24.2 | 3,500 | 580 |
| Control A | None | Lauryl mercaptan—0.5 part | 15½ | 75 | 14.8 | 2,600 | 450 |
| Control B | None | None | >41 | | <5.0 | <2,000 | <250 |

[1] An aqueous solution made up from 0.05 part sodium pyrophosphate, 0.035 part ferric sulfate and 0.012 part cobaltous chloride.

It is apparent from the table that the presence of the modifiers of this invention enables butadiene-1,3 styrene copolymers of high solubility and plasticity and of excellent physical properties to be obtained in high yields and in a short time, particularly when polymerization catalysts are also present, whereas this is not possible when no modifier of polymerization is employed. Moreover, it is also apparent that the polymers prepared in accordance with the method of this invention are superior to and are obtained in higher yield than those prepared when lauryl mercaptan alone, one of the most effective of the known modifiers of polymerization, is present during the polymerization.

EXAMPLE 11

An emulsion containing the following ingredients was prepared:

| | Parts |
|---|---|
| Butadiene-1,3 | 66 |
| Acrylonitrile | 54 |
| Hydrogen peroxide | 0.6 |
| Emulsifying solution (2% aqueous solution of myristic acid 85% neutralized with sodium hydroxide) | 250 |
| Sodium ferri pyrophosphate | 0.3 |
| Cobaltous chloride | 0.005 |
| Sodium sulfate | 0.12 |
| 5-tert.-butyl-2-mercaptobenzothiazole | 0.53 |

The emulsion was then polymerized for 16 hours at 30° C. whereupon a 97% yield of a plastic, soluble, synthetic rubber closely resembling natural crude rubber was obtained by coagulating the polymerized emulsion. The synthetic rubber obtained was easily milled on either a hot or cold mill, and when vulcanized, possessed a tensile strength of 4500 to 5500 lbs. per sq. in., and an ultimate elongation of 600 to 700%. In the absence of the modifier, only a 90% yield of copolymer was obtained in 18 hours and the copolymer was tough, non-plastic and non-soluble, difficult to mill, and when vulcanized possessed elongations of only 270 to 320%. When 2-mercaptobenzothiazole was employed in place of the 5-tertiary-butyl-2-mercaptobenzothiazole, the polymerization required 25 hours to produce a 90% yield, and a product having elongations of only 350 to 450% was obtained. Moreover when diisopropyl dixanthagen, one of the most effective of the known modifiers for butadiene-1,3 acrylonitrile copolymerization was employed in place of the 5-tertiary-butyl-2-mercaptobenzothiazole, the polymer obtained was plastic and soluble, but the polymerization required 23½ hours to produce an 89% yield, thus showing that the modifiers of this invention possess the advantages of the known modifiers, and in addition enable higher yields of polymer to be obtained in shorter time.

EXAMPLE 12

A mixture of 90 parts of butadiene-1,3 and 30 parts of styrene was emulsified with 250 parts of a 3% aqueous solution of the sodium soap of saturated fatty acids, which solution also contained 0.28 part of hydrogen peroxide as a polymerization initiator, and 0.125 part of a polymerization catalyst comprising complex pyrophosphates of iron and cobalt, was polymerized at 30° C. in the presence of 0.44 part of lauryl mercaptan, and 0.14 part of 5-tertiary-butyl-2-mercaptobenzothiazole. After 22½ hours, an 89% yield of an excellent rubbery butadiene-1,3 styrene copolymer was obtained. The copolymer was soft and plastic and soluble in benzene. It milled readily, and when vulcanized, it possessed a tensile strength of 4,000 to 5,000 lbs. per sq. in. and an elongation of 650 to 750%. In the absence of the 5-tertiary-butyl-2-mercaptobenzothiazole, the synthetic rubber obtained possessed a tensile strength when vulcanized of only 2,000 to 3,000 lbs. per sq. in.

EXAMPLE 13

An emulsion comprising a mixture of 55 parts of butadiene-1,3, 25 parts acrylonitrile, and 20 parts of methyl methacrylate as the polymerizable materials; sodium isobutyl naphthalene sulfonate as the emulsifying agent; hydrogen peroxide as the polymerization initiator, and 4,5-dimethylbenzothiazole as the polymerization modifier was polymerized at 40° C. There was obtained an excellent synthetic rubber which was more plastic and more soluble in benzene, and which was more readily subjected to the processing operations employed with unvulcanized natural rubber than was the rubber obtained in the absence of the thiazole, thus illustrating the effectiveness of the modifiers of this invention with mixtures comprising more than two polymerizable materials, and in an emulsion comprising emulsifying agents other than soap.

While the above examples illustrate preferred procedures and partially indicate the extent to which variations and modifications in nature and amounts of polymerizable material, of modifiers and of other substances may be made therein, it is to be understood that many other variations and modifications in polymerization methods will occur to those skilled in the art and are within the spirit and scope of the invention as defined by the appended claims.

We claim:

1. The method which comprises polymerizing in aqueous emulsion a butadiene-1,3 hydrocarbon in the presence of a compound containing an alkyl group attached to a ring carbon atom of a 2-thio-arylenethiazyl group.

2. The method which comprises polymerizing in aqueous emulsion a mixture of a butadiene-1,3 hydrocarbon and a compound copolymerizable therewith in aqueous emulsion, in the presence of a compound containing an alkyl group attached to a ring carbon atom of a 2-thio-arylenethiazyl group.

3. The method which comprises polymerizing in aqueous emulsion a mixture of a butadiene-1,3 hydrocarbon and a compound copolymerizable therewith in aqueous emulsion, in the presence of a compound containing an alkyl group attached to a ring carbon atom of a 2-thio-benzothiazole group.

4. The method of claim 3 further characterized in that the polymerization is carried out in the additional presence of an aliphatic mercaptan containing from 12 to 18 carbon atoms.

5. The method of claim 3 further characterized in that the polymerization is carried out in the additional presence of a water-soluble salt of a heavy metal occurring in group VIII and the first long period of the periodic table.

6. The method which comprises polymerizing in aqueous emulsion a mixture of a butadiene-1,3 hydrocarbon and a compound copolymerizable therewith in aqueous emulsion, in the presence of an alkyl-substituted 2-mercapto-arylenethiazole.

7. The method which comprises polymerizing in aqueous emulsion a mixture of a butadiene-1,3 hydrocarbon and a compound copolymerizable therewith in aqueous emulsion, in the presence of an alkyl substituted 2-mercaptobenzothiazole.

8. The method which comprises polymerizing in aqueous emulsion a butadiene-1,3 hydrocarbon in the presence of a 5-alkyl-2-mercaptobenzothiazole, in which the alkyl group contains from 1 to 6 carbon atoms.

9. The method which comprises polymerizing in aqueous emulsion a mixture of butadiene-1,3 and styrene in the presence of 5-tertiary-butyl-2-mercaptobenzothiazole.

10. The method which comprises polymerizing in aqueous emulsion a mixture of butadiene-1,3 and styrene in the presence of 5-tertiary-butyl-2-mercaptobenzothiazole and in the additional presence of an aliphatic mercaptan containing from 12 to 18 carbon atoms.

11. The method which comprises polymerizing in aqueous emulsion a mixture of butadiene-1,3 and acrylonitrile in the presence of 5-tertiary-butyl-2-mercaptobenzothiazole.

12. The method which comprises polymerizing in aqueous emulsion a mixture of butadiene-1,3 and acrylonitrile in the presence of 5-tertiary-butyl-2-mercaptobenzothiazole and in the additional presence of a water-soluble salt of a heavy metal occurring in group VIII and the first long period of the periodic table.

13. The method which comprises polymerizing in aqueous emulsion a mixture of butadiene-1,3 and styrene in the presence of 2-mercapto-4-methyl benzothiazole.

14. The method which comprises polymerizing in aqueous emulsion a mixture of butadiene-1,3 and styrene in the presence of 2-mercapto-4-methyl benzothiazole and in the additional presence of lauryl mercaptan.

BENJAMIN M. G. ZWICKER.
WILLIAM D. STEWART.